Patented Jan. 13, 1948

2,434,410

UNITED STATES PATENT OFFICE 2,434,410

TRISAZO DYESTUFFS AND A PROCESS OF MAKING SAME

Alfred Jenny and Alex Pedolin, Basel, Switzerland, assignors to J. R. Geigy A. G., Basel, Switzerland, a Swiss firm No Drawing. Application August 16, 1943, Serial No. 498,880. In Switzerland October 17, 1942

5 Claims. (Cl. 260—173)

Trisazo dyestuffs capable of being developed on the fibre and containing diazotisable amino groups in the initial or final component are known in a great number.

We have now made the surprising observation that new valuable trisazo dyestuffs capable of being developed on the fibre are obtained by coupling a diazotised amino-benzene sulfonic acid possessing in p-position to the diazo group a nitrogen-containing substituent, which can be converted into a primary amino group, with a middle component, then further diazotizing the so-obtained amino azo dyestuff, coupling the same once more with a middle component with the condition that for the said middle component at least once a 1-aminonaphthalene-6- or -7-sulfonic acid or technical mixtures thereof or a 2-alkoxy-1-aminonaphthalene-6- or -7-sulfonic acid and at most once an aminohydroquinone dialkyl ether is used, then diazotising the aminodisazo dyestuff and coupling the same with a 2-aroylamino-5-hydroxynaphthalene-7-sulfonic acid and finally converting the nitrogen-containing group which is present in p-position in the first component into a primary amino group.

When as first component a p-acylamino diazobenzene sulfonic acid is used, a trisazo dyestuff is obtained after the third coupling which contains in the first as well as in the last component an acylated amino group. Surprisingly it is now possible to effect the partial saponification in such a manner that only the acyl group in the initial component is split off, but not the acyl group which is present in the final component.

The new dyestuffs dye cellulosic fibres directly in blue, green-blue or grey-blue shades. The dyeings may be developed on the fibre for instance by means of β-naphthol thus producing valuable blue, green-blue or grey shades which with respect to dyeings with known comparable dyestuffs are especially distinguished by an improved lightfastness.

The present invention is now illustrated, but not limited by the following examples, the parts being by weight.

Example 1

23 parts of diazotized 4-acetylamino-1-aminobenzene-3-sulfonic acid are treated with a solution of 22.3 parts of the technical mixture of 1-aminonaphthalene-6- and 7-sulfonic acid. The coupling is completed by adding a little quantity of sodium carbonate. Then the ice-cold monoazo dyestuff solution is treated with 50 parts of hydrochloric acid and diazotised with 7 parts of sodium nitrite. After stirring for several hours a hot hydrochloric acid solution of 15 parts of aminohydroquinone dimethylether is allowed to flow into the said diazo solution. The coupling is completed by addition of 50 parts of sodium acetate. To the solution of the dyestuff then made alkaline by means of caustic soda lye common salt is added. The disazo dyestuff thus precipitated is filtered off and again pasted with water, whereupon it is further diazotised by first adding 6.8 parts of sodium nitrite and subsequently 60 parts of hydrochloric acid. After stirring during several hours the ice-cold diazo solution is caused to flow into a solution of 35 parts of 2-benzoylamino-5-hydroxynaphthalene-7-sulfonic acid to which have previously been added 50 parts of calcinated sodium carbonate. The solution of the trisazo dyestuff is hot treated with common salt and the precipitated dyestuff finally isolated.

The saponification of the acetylamino group is carried out in the following manner:

The moist filtered mass consisting of the trisazo dyestuff is pasted with 500 parts of water and, after having added 40 parts of sodium hydroxide, diluted until a 2.7 to 2.9% caustic soda lye has been produced. The whole is then heated to 97° C. and the temperature maintained, while stirring, for 45 minutes at 97°–99° C.; then common salt and 45 parts of hydrochloric acid are added. The precipitated and saponified dyestuff is filtered and dried. It constitutes a blackish powder which is soluble in water with a blue coloration and in sulfuric acid with a green violet coloration.

The dyestuff dyes cellulosic fibres, when applied directly or developed by means of β-naphthol, in greenish-blue shades, the dyeings possessing very good fastness properties.

A dyestuff with the same properties is obtained by using as final component the 2-p-chlorobenzoylamino-5-hydroxynaphthalene-7-sulfonic acid instead of 2-benzoyl-amino-5-hydroxynaphthalene-7-sulfonic acid. The same result is also obtained, if the aminohydroquinone dimethylether is replaced by its diethylether.

Example 2

23 parts of diazotised 4-acetylamino-1-aminobenzene-3-sulfonic acid are treated with a solution of 22.3 parts of 1-naphthylamine-6-sulfonic acid and the coupling is completed by adding a little sodium carbonate. Then the ice-cold monoazo dyestuff solution is treated with 50 parts of hydrochloric acid, diazotised with 7 parts of sodium nitrite and, after stirring for several hours combined with a solution of 22.3 parts of 1-naphthylamine-6-sulfonic acid being neutral to litmus and containing 50 parts of sodium acetate. The solution of the aminoazodyestuff is made faintly alkaline to litmus by adding sodium carbonate, then treated with 8 parts of sodium nitrite and acidified by allowing 90 parts of hydrochloric acid to flow therein. The ice-cold diazo solution thus obtained is caused to flow into a solution of 35 parts of 2-benzoylamino-5-hydroxynaphthalene-7-sulfonic acid to which have previously been added 65 parts of calcinated sodium carbonate. The solution of the trisazo dyestuff thus obtained is precipitated from the hot solution by means of common salt and worked up in the usual manner.

The saponification of the acetylamino group is carried out in the following manner.

The moist filtered mass of the trisazo dyestuff is pasted in 500 parts of water and, after having added 40 parts of sodium hydroxide, diluted until a 3.2 to 3.5% caustic soda lye has been produced. The whole is heated to 97° C. and the temperature maintained, while vigorously stirring, for 45 minutes at 97°–99° C., whereupon common salt and 45 parts of hydrochloric acid are added. The precipitated dyestuff is isolated in the usual manner and dried. It constitutes a blackish powder which is soluble in water with a blue coloration and in concentrated sulfuric acid with an initially dirty olive-green coloration which after a certain time passes into a dull violet coloration.

The dyestuff dyes cellulosic fibres in greenish navy-blue shades, when directly applied to the fibres, or in greenish-blue shades, when developed with β-naphthol. The direct as well as the developed dyeings possess very good fastness properties.

Example 3

26 parts of 1-amino-4-oxalylaminobenzene-3-sulfonic acid diazotised in the usual manner and coupled with 22.3 parts of 1-aminonaphthalene-7-sulfonic acid in an acetic acid solution. When the formation of the monoazo dyestuff is complete, the mixture is made alkaline with sodium carbonate and treated with 7 parts of sodium nitrite, whereupon 70 parts of concentrated hydrochloric acid are rapidly added thereto at 0° C. After stirring for 20 hours common salt is introduced thereinto and the diazo body thus separated is filtered off. The coupling is then carried out with 25.3 parts of 1-amino-2-methoxy-naphthalene-6-sulfonic acid in presence of 10 parts of sodium acetate. In order to complete the interaction 5 parts of sodium carbonate are still slowly added. Then the whole is made alkaline by means of 20 parts of sodium carbonate, the aminodisazo dyestuff is precipitated by means of common salt and filtered off. The cake mass is dissolved in water, treated with 9 parts of sodium nitrite, cooled to 0° C. and diazotised by adding rapidly 80 parts of hydrochloric acid. The diazo body is precipitated by the addition of common salt, filtered and coupled with 34.3 parts of 2-benzoylamino-5-hydroxynaphthalene-7-sulfonic acid in the presence of 30 parts of sodium carbonate and 150 parts of pyridine. When the reaction has completed the dyestuff is filtered off and saponified in the manner described in Example 1. The new dyestuff forms a dark powder which is soluble in water with a greenish-blue coloration and in sulfuric acid with a blue coloration. It dyes cellulosic fibres in greenish-blue shades, when directly dyed, and in navy-blue shades, when diazotised on the fibre and after-treated with β-naphthol. The fastness properties of the dyeings are very good.

A dyestuff with the same properties is obtained by using 1-amino-2-ethoxynaphthalene-6-sulfonic acid instead of 1-amino-2-methoxy-naphthalene-6-sulfonic acid. If both the middle components are interchanged in such a manner that the coupling is first carried out with 1-amino-2-naphtholmethyl or ethylether and only subsequently with 1-aminonaphthalene-7-sulfonic acid, dyestuffs are obtained which show similarly good properties.

Example 4

21.8 parts of diazotised 1-amino-4-nitrobenzene-3-sulfonic acid are coupled with 22.3 parts of 1-amino-naphthalene-6-sulfonic acid dissolved in 200 parts of water and 6 parts of sodium carbonate. The coupling is completed by allowing 12.5 parts of sodium acetate dissolved in a little water. Then the mixture is made alkaline by means of sodium carbonate, treated with 7 parts of sodium nitrite and subsequently with 60 parts of hydrochloric acid at 3° C. The diazo body thus formed is completely precipitated by strewing in common salt, then filtered and combined with 22 parts of 1-aminonaphthalene-6-sulfonic acid in a slightly acetic acid solution.

The acid thus becoming free is gradually neutralised with 7 parts of sodium carbonate. When the dyestuff formation is finished, there is salted out by means of common salt in a soda-alkaline solution and the dyestuff thus precipitated isolated by filtration. The amino disazo dyestuff is dissolved in 1500 parts of water, treated with 40 parts of hydrochloric acid and diazotised at 0° C. with 7 parts of sodium nitrite. After 7 hours the so-obtained diazo body is combined with a solution of 34.3 parts of 2-benzoylamino-5-hydroxynaphthalene-7-sulfonic acid in 600 parts of water, 30 parts of sodium carbonate and 150 parts of pyridine. After completion of the coupling the trisazo dyestuff is precipitated by means of common salt and then filtered. In order to reduce the nitro group the dyestuff is dissolved in 2000 parts of water at 45° C., then treated with 11.7 parts of sodium sulfide, while the temperature is maintained for 1 hour at 45°–50° C. and then for a further hour at 55°–60° C. Finally it is neutralised with 22 parts of hydrochloric acid; the reduced dyestuff is then precipitated by means of 100 parts of common salt and filtered after cooling. The dyestuff dissolves in water with a reddish-blue coloration and in concentrated sulfuric acid with an olive-black coloration and dyes cellulosic fibres, when used directly or developed by means of β-naphthol in greenish blue shades, the dyeings possessing good fastness properties.

Example 5

$\frac{1}{10}$ mol of the diazomonoazo dyestuff obtainable from 1-amino-4-acetylaminobenzene-3-sulfonic acid and 1-aminonaphthalene-7-sulfonic acid is coupled in an acetic acid solution with 22 parts of 1-aminonaphthalene-7-sulfonic acid. The reaction is accelerated by allowing 7 parts of sodium carbonate in 50 parts of water to drop thereinto. After a long stirring the disazo dyestuff thus precipitated is filtered off, dissolved in 1000 parts of water, while adding little quantities of sodium carbonate until the solution has become alkaline, then 7 parts of sodium nitrate are added thereto and the whole is allowed to drop at 0° C. into 40 parts of concentrated hydrochloric acid. After 6 hours the diazotation is complete. The so-obtained diazo body is poured into a solution of 34.3 parts of 2-benzoylamino-5-hydroxynaphthalene-7-sulfonic acid in 400 parts of water and 20 parts of sodium acetate, whereupon still 17 parts of sodium carbonate dissolved in 100 parts of water are caused to drop thereinto within 2 hours. After 20 hours the precipitated trisazo dyestuff is filtered off, saponified in the manner described in Example 2 and isolated. It constitutes a dark powder which is soluble in water with a blue coloration and in concentrated sulfuric acid with a black coloration.

The dyestuff dyes cellulosic fibres, when dyed directly or after-treated with β-napthol, in blue shades of good fastness to light.

*Example 6*

21.8 parts of 4-nitro-1-aminobenzene-3-sulfonic acid are diazotised in the usual manner and coupled in an acetic acid solution with 22.3 parts of 1-aminonaphthalene-6-sulfonic acid. The completed monoazo dyestuff is dissolved in an alkaline medium by adding caustic soda lye, then mixed with 7 parts of sodium nitrite and diazotised by rapidly adding 60 parts of hydrochloric acid at 0° C. After 8 hours the separated diazoazo dyestuff is filtered off and coupled with 22 parts of 1-aminonaphthalene-6-sulfonic acid in the presence of 15 parts of sodium acetate thus giving the disazo dyestuff. The components are completely combined by allowing 4 parts of sodium carbonate with 20 parts of water to drop into the said mixture. When the coupling has completed, the mixture is made distinctly alkaline by means of sodium carbonate and treated with 9 parts of sodium nitrite, whereupon the mixture is introduced in 80 parts of hydrochloric acid at 0° C. Then the diazodisazo body thus precipitated is filtered after 8 hours, coupled with 34.3 parts of 2-benzoylamino-5-hydroxynaphthalene-7-sulfonic acid in the presence of 30 parts of sodium carbonate thus giving the trisazo dystuff which is reduced by means of sodium sulfide as described in Example 4. The so-obtained amino-trisazo dyestuff constitutes a blackish powder which is soluble in water with a reddish-blue coloration and in concentrated sulfuric acid with a black coloration. It dyes cellulosic fibres, when used directly or after-treated by means of β-naphthol, in blue shades, the dyeings possessing good fastness properties.

What we claim is:

1. The trisazo dyestuffs capable of being developed on the fibre having the general formula (p) NH₂—A—N=N—B—N=N—C—N=N—D wherein A stands for an aromatic radical of the benzene series containing a sulfonic acid group in m-position to the azo group, B stands for the naphthalene radical containing in 1:4-position both the azo groups, in one of the positions 6 and 7 a sulfonic acid group and in 2-position a member of the group consisting of H and OCH₃, C stands for a radical selected from the group consisting of B and of a benzene radical containing in 1:4-position both the azo groups and in 2:5-position two lower alkoxy groups and D stands for a member of the group consisting of 2 - benzoylamino - 5-hydroxynaphthalene-7-sulfonic acid and 2-p-chlorobenzoylamino-5-hydroxynaphthalene-7-sulfonic acid, being dark powders, dyeing cellulose fibres in blue, greenish-blue and grey shades, capable of being developed by diazotising and coupling with azo components.

2. The trisazo dyestuffs capable of being developed on the fibre of the general formula

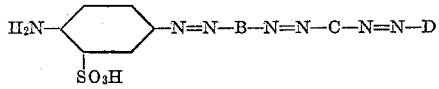

wherein B stands for the naphthalene radical containing in 1:4-position both the azo groups, in one of the positions 6 and 7 a sulfonic acid group and in 2-position a member of the group consisting of H and OCH₃, C stands for a radical selected from the group consisting of B and of a benzene radical containing in 1:4-position both the azo groups and in the 2:5-position two lower alkoxy groups and D stands for a member of the group consisting of 2-benzoylamino-5-hydroxynaphthalene-7-sulfonic acid and 2-p-chlorobenzoylamino - 5 - hydroxynaphthalene - 7 - sulfonic acid, being dark powders, dyeing cellulose fibres in blue, greenish-blue and grey shades, capable of being developed by diazotising and coupling with azo components.

3. The trisazo dyestuff capable of being developed on the fibre having the formula

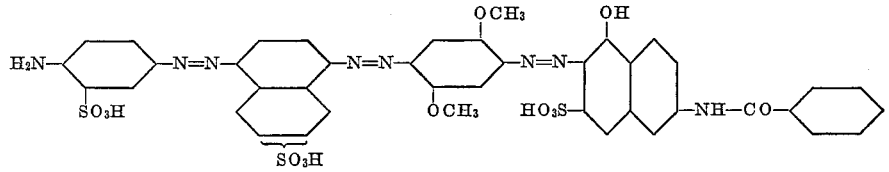

being a blackish powder dissolving in water with a blue coloration and in sulfuric acid with a greenish-violet coloration and dyeing cellulosic fibres, when used directly and when developed with β-naphthol, in greenish-blue shades of very good fastness properties.

4. The trisazo dyestuff capable of being developed on the fibre having the formula

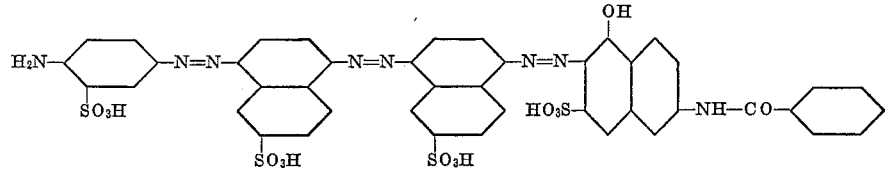

being a blackish powder dissolving in water with a blue coloration and in sulfuric acid with a dull olive coloration turning after some time to dull violet, dyeing cellulosic fibres, when used directly in greenish navy-blue shades and when developed with β-naphthol in greenish-blue shades of very good fastness properties.

5. The trisazo dyestuff capable of being developed on the fibre having the formula

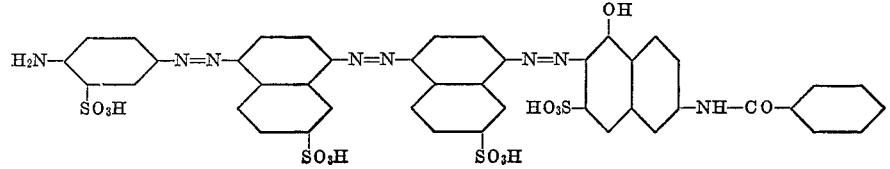

being a dark powder dissolving in water with a blue coloration and in sulfuric acid with a black coloration dyeing cellulosic fibres, when used directly and when developed with β-naphthol, in blue shades of very good fastness properties.

ALFRED JENNY.
ALEX PEDOLIN.

REFERENCES CITED

The following references are of record in the file of this patent:

UNITED STATES PATENTS

| Number | Name | Date |
|---|---|---|
| 2,227,546 | Krebser | Jan. 7, 1941 |
| 1,913,382 | Gubelmann | June 13, 1933 |

FOREIGN PATENTS

| Number | Country | Date |
|---|---|---|
| 519,644 | Great Britain | Apr. 2, 1940 |
| 25,780 | Great Britain | Oct. 30, 1902 |
| 132,807 | Switzerland | July 1, 1929 |
| 432,122 | Great Britain | July 22, 1935 |
| 477,914 | Germany | June 19, 1929 |
| 142,653 | Switzerland | Dec. 16, 1930 |
| 297,506 | France | June 9, 1900 |